United States Patent

[11] 3,623,106

[72] Inventor Eugene A. Zerega, Jr.
Schiller Park, Ill.
[21] Appl. No. 838,733
[22] Filed July 3, 1969
[45] Patented Nov. 23, 1971
[73] Assignee Motorola, Inc.
Franklin Park, Ill.

[54] MULTIFREQUENCY RECEIVER EMPLOYING TONE-CODED SQUELCH WITH AUTOMATIC CHANNEL SELECTION
8 Claims, 1 Drawing Fig.

[52] U.S. Cl. 343/206, 325/469
[51] Int. Cl. H04j 1/14
[50] Field of Search 325/392, 466, 469; 343/206

[56] References Cited

UNITED STATES PATENTS 3,201,696 8/1965 Sharp 325/469 X

*Primary Examiner*—Ralph D. Blakeslee
*Attorney*—Mueller and Aichele

ABSTRACT: A switching system for a multichannel receiver employing a tone-coded squelch circuit includes a plurality of local oscillators for operating on different channels and renders the oscillators operative in turn, with the switching system being latched when a carrier is received to hold the receiver on the channel having the carrier for a length of time sufficient to enable oscillations to build up in the tone-operated squelch circuit, thereby permitting the cycle of operation of the switching system to be independent of the time required for oscillation buildup in the tone-operated squelch circuit which then assumes control of the operation of the switching circuit.

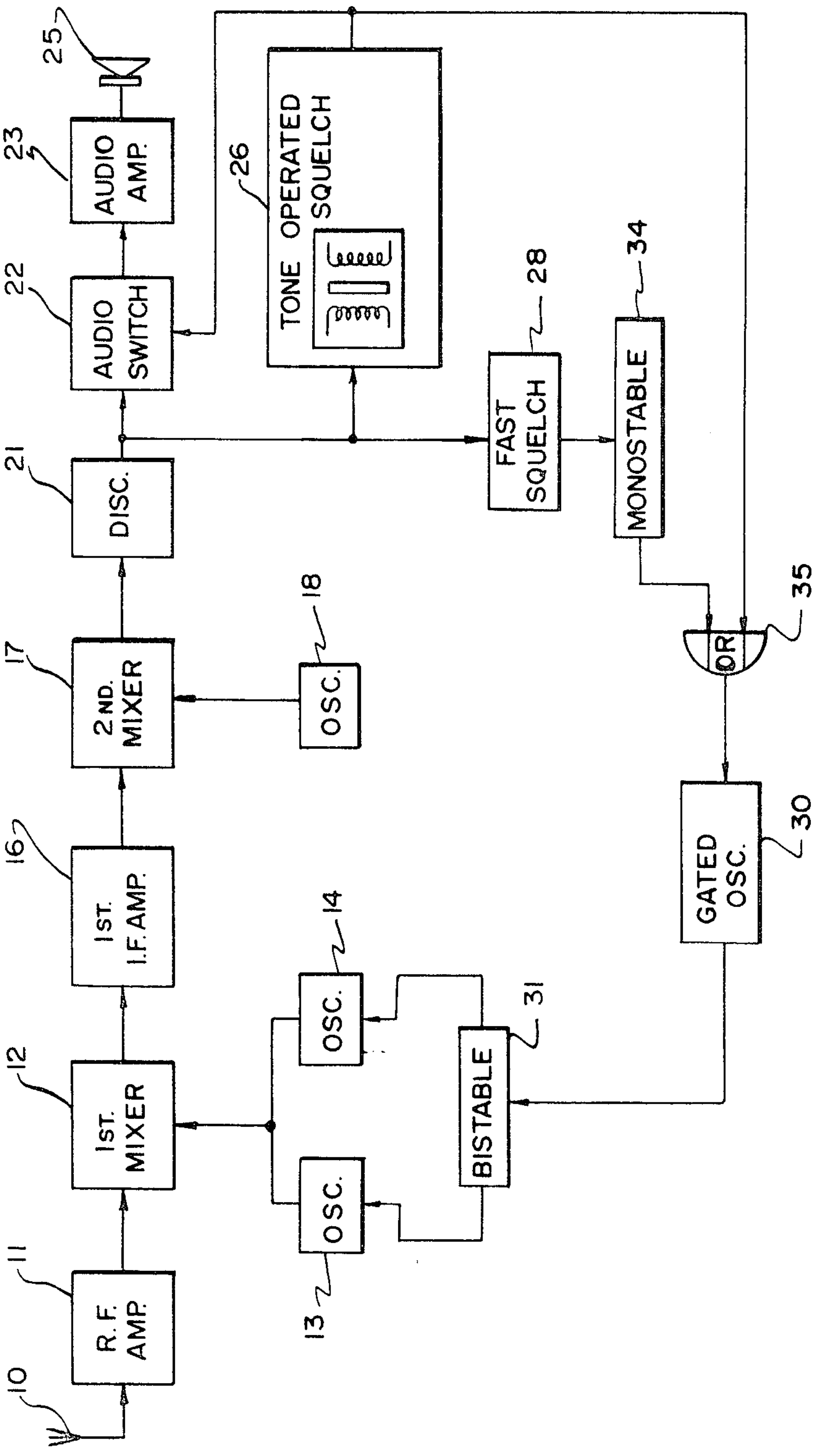
INVENTOR.
EUGENE A. ZEREGA, JR.
BY Mueller, Aichele & Rauner
ATTORNEYS

MULTIFREQUENCY RECEIVER EMPLOYING TONE-CODED SQUELCH WITH AUTOMATIC CHANNEL SELECTION

BACKGROUND OF THE INVENTION

Multifrequency receivers are known having automatic switching apparatus for selecting tuning elements to provide reception on a plurality of different channels. The channels may be selected by an automatic control system which selectively connects different tuned circuits in the receiver circuit until a carrier wave is detected on a channel, at which time the automatic switching is terminated.

Receivers employing tone-operated squelch circuits also are utilized in order to permit selective calling of particular receivers operating on the same channel as other receivers for which the messages are not intended. Each receiver responds to a particular tone which is used to modulate the carrier in addition to the audio information; and if such a receiver also is employed as a multifrequency or multichannel receiver, the tone modulates the different channels which the receiver may receive. In order to detect the tone, the tone-operated squelch circuit generally utilizes a tuned reed frequency-responsive unit which is responsive to that particular tone only. Upon receipt of a tone, a predetermined length of time must elapse before sufficient oscillations are built up in the reed to produce a usable output from the squelch circuit to close the audio channel to permit reproduction of the audio signals by the speaker of the receiver. This period of time required for reed buildup to occur is relatively long; so that if a tone-operated squelch circuit is employed in a multichannel receiver which also includes a provision for scanning the channels, a relatively long sampling time also is necessary in order to insure adequate time for the reed built-up upon the detection of a carrier modulated by the particular tone to which the receiver is responsive.

Such a receiver detects a tone-modulated carrier and locks onto the particular channel on which such a carrier is detected so long as the carrier is detected toward the beginning of the sampling cycle. If the carrier appears on the channel at a later time in the sampling cycle, so that the remaining time of the cycle is insufficient to permit reed buildup, no output is obtained from the tone-operated squelch circuit before the end of the cycle. As a result, switching to another channel takes place even though a carrier did appear on the channel which previously was being sampled. Therefore, the receiver operates as if no carrier was present on the sampled channel when, in fact, a carrier did appear during the sampling interval.

Also, the possibility exists, should a carrier appear on the channel at just the right time in the sampling cycle, to initiate reed buildup just to the point before an output is obtained from the squelch circuit. Should switching to another channel occur at this point, reed oscilations will still be present and in the process of decaying. It is therefore possible, should all the above conditions be right, that these oscillations of the reed will momentarily open the squelch in the new channel, resulting in a burst of noise heard through the speaker of the receiver. This is known as "falsing."

It is desirable to provide a multichannel receiver having a tone-operated squelch circuit which may employ a channel sampling interval which is not dependent on the length of time required for the reed buildup of the tone-operated squelch circuit. It also is desirable to cause the system to lock onto a channel on which a carrier appears at any time during the sampling interval and to remain locked onto that channel if a tone is in fact present thereon.

SUMMARY OF THE INVENTION

Accordingly it is an object of the present invention to provide a multifrequency superheterodyne receiver employing a tone-operated squelch circuit and operable on a plurality of channels with a channel scanning system having a scanning rate independent of the buildup time of the tone-operated squelch circuit.

It is another object of this invention to extend the scanning interval in a multifrequency superheterodyne receiver channel scanning system by a length of time sufficient to permit oscillation buildup in a tone-operated squelch circuit whenever a carrier is detected at any time during the sampling interval for a channel.

It is a further object of this invention, in a multifrequency superheterodyne receiver having a tone operated squelch circuit, to scan the channels to which the receiver may respond at a rate which is in excess of the rate required for buildup of oscillations in the tone-operated squelch circuit, and to extend the scanning interval for a channel whenever a carrier is detected thereon, so that sufficient time is permitted for buildup of oscillations in the tone-operated squelch circuit when such a carrier is detected.

In accordance with a preferred embodiment of this invention, a radio receiver of the superheterodyne type for receiving signals on a predetermined number of channels includes a tone-operated squelch circuit requiring a predetermined time interval for providing an output after the application of a tone thereto an further includes an oscillator means having a plurality of different outputs corresponding in frequency to the different channels to be received by the receiver. A switching circuit, controlled by a first timing control circuit producing output pulses at a predetermined frequency, is used to control the oscillator means to cause the outputs thereof to change in frequency in accordance with a predetermined pattern of operation. An additional carrier detection means is provided in the receiver; and whenever a carrier is detected on a sampled channel, an output is obtained from this carrier detection means and is applied to a second timing means providing a timing interval at least as long as the timing interval of the tone-operated squelch for disabling the operation of the first timing control means for such a time interval. Thus, if the carrier also is modulated by the particular tone to which the receiver is responsive, the sampling interval is extended by a length of time sufficient to permit operation of the tone-operated squelch circuit, irrespective of when the carrier appeared during the sampling cycle. The tone-operated squelch circuit output then continues to disable the first timing control means so long as the tone-modulated carrier remains on the channel.

BRIEF DESCRIPTION OF THE DRAWING

The sole FIGURE of the drawing is a block diagram of a multichannel tone-operated squelch receiver in accordance with a preferred embodiment of the invention.

DETAILED DESCRIPTION

Referring now to FIG. 1 there is shown a receiver of the superheterodyne type wherein signals received by an antenna 10 are amplified by a radiofrequency amplifier 11 and are applied to a first mixer circuit 12. The first mixer circuit 12 is controlled by the local oscillations supplied selectively thereto by a pair of local oscillators 13 and 14, only one of which is rendered operative at a time. The output of the first mixer 12 is applied through a first IF amplifier 16 and from the amplifier 16 to a second mixer 17, which is supplied with local oscillations from an oscillator 18. The output of the second mixer 17 then is applied to a discriminator 21, with the modulation at the output of the mixer 17 being derived from the signal by the discriminator 21. It should be noted that an additional IF amplification stage or stages may be provided between the second mixer 17 and the discriminator 21 if such additional amplification is necessary.

Signals obtained from the output of the discriminator 21 are passed through an audio switch 22 to an audio amplifier 23, the output of which is supplied to a loudspeaker 25 for reproduction of the audio signal. In order to provide for selective calling of particular receivers operating on the same channel or carrier frequency, a tone-operated squelch circuit 26 also is connected to the output of the discriminator 21 and closed the audio switch 22 by the application of an output signal to the audio switch 22 whenever a carrier wave, modulated by the particular tone to which the tone-operated squelch circuit 26 is responsive, is received.

The tone-operated squelch circuit 26 may include as the tone-responsive element thereof a conventional reed filter having a primary winding, a reed and a secondary winding. Tone signals of the desired frequency are applied to the primary winding of the reed filter and cause mechanical vibrations of the reed which then couples energy to the secondary output winding. Signals which are not of the desired tone frequency to which the reed is tuned are highly attenuated by the reed filter and are not coupled to the output; so that an output is obtained from the tone-operated squelch circuit 26 only when a tone of the particular frequency to which the circuit 26 is responsive modulates the received carrier.

It should be noted that a predetermined fixed interval of time is required in order for sufficient oscillations to build up in the reed to produce a usable output from the tone-operated squelch circuit 26 after a tone of the desired frequency is applied to the input. Typically, the time interval for such an oscillation buildup to produce a usable output is of the order of 200 ms. If multiple channel reception utilizing channel scanning is employed with such a system, it has been the practice in the past to utilize a relatively slow speed sampling or scanning rate (sampling times greater than the 200 ms. response time of the squelch circuit) in order to allow sufficient time in each sampling interval to permit the full detection of the tone-modulated carrier by the tone-operated squelch circuit. If such a long sampling time is employed, the initial syllable or syllables of a received message often can be lost if a carrier appeared on one channel during the sampling time interval of another channel. In addition, a tone-modulated carrier appearing less than 200 ms. from the end of the sampling interval, i.e., less than the response time of the squelch circuit, would not be detected until the next sampling interval for that channel.

In the circuit shown in the drawing, the sampling time for the multiple channel receiver is independent of the slow response time of the tone-operated squelch circuit 26, and this is accomplished by the addition of a second fast squelch circuit 28 which is responsive only to the presence of a carrier detected by the receiver and does not include the tone detection feature. The squelch circuit 28 may be a conventional squelch circuit having an operating time of the order of 50 ms. or it may be what is known as a "fast squelch" with a response time of less than 20 ms. Whichever one of these types of squelch circuits are employed for the squelch circuit 28, however, the response time is considerably faster than the response time of the tone-operated squelch circuit 26.

Scanning control, when no carriers are present on any of the channels, is obtained from the output of a gated oscillator circuit 30 which normally is free-running to provide a sequence of pulses at the scanning rate of the circuit. The interval between the pulses produced by the oscillator 30 may be the same as, greater than, or substantially less than the time interval required to operate the tone-operated squelch circuit 26 and preferably is of a duration substantially less than this interval, in order to provide the most efficient scanning of the channels when no carriers are being received. The output pulses from the gated oscillator 30. The outputs of the bistable multivibrator 31 then are alternately energized to provide an operating potential to the oscillators 13 and 14 in a repetitive sequence.

If at any time during a sampling interval for the particular channel corresponding to one or the other of the oscillators 13 and 14 a carrier is present, the fast squelch circuit 28 provides an output signal indicative of the presence of this carrier and triggers a monostable multivibrator 34 into its nonstable or astable state. The output pulse obtained from the monostable multivibrator 34 then is passed through an OR-gate 35 to disable the operation of the gated oscillator 30, so that no additional pulses are obtained from the output thereof. Thus, the gated oscillator 30 is disabled for a time interval corresponding to the time interval of the output pulse obtained from the monostable multivibrator 34 to hold the receiver on the channel on which the carrier was detected.

In order to provide sufficient time to build up oscillations in the tone-operated squelch circuit 26, if the carrier is in fact modulated by the desired tone, the timing period of the monostable multivibrator 34, when added to the operating time of the fast squelch circuit 28, is chosen to be the same as or slightly in excess of the time interval required for the buildup of oscillations by the squelch circuit 26. Thus, if the detected carrier also is modulated by the desired tone, an output is obtained from the tone-operated squelch circuit 26 before the end of the timing interval of the monostable multivibrator 34. When an output is obtained form the tone-operated squelch circuit 26, it also is applied through the OR-gate 35 to the gated oscillator 30, continuing to disable the oscillator 30. As stated previously, the output of the squelch circuit 26 also is applied to the audio switch 22 to close the switch to permit the passage of audio signals therethrough to the amplifier 23.

Whenever the tone-modulated carrier ceases to exist or terminates on the channel being monitored, the output of the tone-operated squelch circuit terminates; and, since the monostable multivibrator 34 also long since has reverted back to its stable state, no signals are passed by the OR-gate 35 to the gated oscillator 30, which then is permitted to resume free-running operation to reinitiate the scanning of the oscillators 13 and 14 under the control of the bistable multivibrator 31. This scanning continues until once again a carrier is detected by the fast squelch circuit 28, whereupon the foregoing cycle of operation is repeated.

If more than two channels are desired to be scanned by the circuit, additional oscillators similar to the oscillators 13 and 14 may be provided, and a ring counter driven by the output of the gated oscillator 30 may be utilized in place of the bistable multivibrator 31 to sequentially cause scanning of the different local oscillators. The operation of the remainder of the circuit would remain the same.

It also is possible to employ priority channel scanning with the above system, wherein the channel which is designated as a priority channel is repetitivley monitored or sampled even during receipt of a tone-modulated carrier on one of the other channels. A number of systems for such priority channel monitoring exist and could be utilized in conjunction with the circuit described above. It should be noted, however, that at any time a carrier is detected on the priority channel, whether or not it is modulated by a tone, the sampling interval is extended to be at least as long as the buildup time of the tone-modulated squelch circuit 26. If a 200 ms. time interval is required for buildup in the squelch circuit, and audio "hole" would be detected in the channel being received at the time the priority sampling was made, even if the desired tone were not detected on the carrier present on the priority channel. Obviously, if the time interval for buildup of oscillations in the tone-modulated squelch circuit 26 is of shorter duration, the objectionable size of such a "hole" would be correspondingly reduced, since the timing interval of the monostable multivibrator 34 could also be proportionally reduced to correspond to the shorter response time of such a squelch circuit.

The circuit which has been described provides channel scanning capabilities in a tone responsive receiver in which the channel scanning time or rate is independent of the buildup time of the tone-operated squelch circuit in the receiver. The circuit furthermore insures that sufficient time is provided for buildup of oscillations in the tone-operated squelch circuit whenever a carrier appears during any portion of the sampling interval, so long as sufficient time remains for the fast operating squelch circuit to provide an output.

I claim:

1. A radio receiver of the superheterodyne type for receiving signals on a predetermined number of channels and having a tone-operated squelch circuit requiring a predetermined time interval for providing an output after application of a tone signal thereto, said receiver having a channel scanning circuit including in combination:

mixing means operative to provide reception of said radio receiver on said different channels;

oscillator means connected to the mixing means for providing output signals at different frequencies corresponding to said different channels;

switching means having at least first and second conditions of operation coupled to the oscillator means for controlling the output frequency of the oscillator means in accordance with the condition of operation of the switching means;

a first timing control circuit means connected with the switching means and having a predetermined cycle of operation for controlling the condition of operation of the switching means;

carrier detecting means responsive to the receipt of a carrier by said receiver for providing an output signal;

second timing means responsive to the output signal of the carrier detecting means for providing an output pulse of a length which is substantially as long as said predetermined time interval; and means responsive to the output pulse of the second timing means or the output of the tone-operated squelch circuit for disabling the operation of the first timing control means to prevent further operation means so long as the first timing control means is disabled.

2. The combination according to claim 1 wherein the first timing control means is an oscillator providing a sequence of output trigger pulses; and wherein the switch means has a plurality of stable states and is triggered from one stable state to another upon the application of each trigger pulse from the output of the oscillator.

3. The combination according to claim 2 wherein the switch means is a bistable multivibrator.

4. The combination according to claim 2 wherein the second timing means is a monostable multivibrator having a timing period at least as long as said predetermined time interval.

5. The combination according to claim 1 wherein the disabling means is an OR gate, the output of which is connected to control the operation of the first timing control means and the inputs to which are obtained from the outputs of the carrier detecting means and the tone-operated squelch circuit.

6. The combination according to claim 1 wherein the carrier detecting means is an addition squelch circuit providing an output in response to detection of a carrier within a time interval which is less than said predetermined time interval of the tone-operated squelch circuit.

7. A radio receiver of the superheterodyne type for receiving signals on a predetermined number of channels and having a discriminator and a tone-operated squelch circuit responsive to the output of the discriminator, the tone-operated squelch circuit requiring a predetermined time interval for providing an output after the application of a detected tone thereto, said receiver having a channel scanning circuit including in combination:

mixing means operative to provide reception of said radio receiver on said different channels;

oscillator means connected to the mixing means for providing output signals at different frequencies corresponding to said different channels;

a bistable switching device having first and second outputs coupled to the oscillator means for controlling the output frequency of the oscillator means in accordance with the condition of operation of the bistable device;

a gated oscillator coupled to the input of the bistable device for providing a train of trigger pulses thereto to cause the bistable device to switch from one stable state to the other upon the receipt of each trigger pulse;

a second squelch circuit responsive to the output of the discriminator for producing an output indicative of the presence of a receiver carrier, said output being produced within a time interval which is less than said predetermined time interval;

a monostable multivibrator triggered from its stable state to its astable state by the output of the second squelch circuit; and an OR gate having as inputs thereto the outputs of the tone-operated squelch circuit and the monostable multivibrator for controlling the operation of the gated oscillator to disable the gated oscillator whenever an output is obtained from either one of the tone-operated squelch circuit and the monostable multivibrator in its astable state.

8. The combination according to claim 7 wherein the astable state of the monostable multivibrator exists for a time interval which, when added to the response time of the second squelch circuit is at least as long as said predetermined time interval.

* * * * *